United States Patent [19]
Connah et al.

[11] Patent Number: 5,418,887
[45] Date of Patent: May 23, 1995

[54] DATA PROCESSING APPARATUS FOR A TEMPROAL BASED RULE SYSTEM

[75] Inventors: David M. Connah, Reigate; Peter R. Wavish, West Hoathly, both of England

[73] Assignee: U.S. Philips Corporation, New York, N.Y.

[21] Appl. No.: 235,110

[22] Filed: Apr. 28, 1994

Related U.S. Application Data

[63] Continuation of Ser. No. 972,058, Nov. 5, 1992, abandoned, which is a continuation of Ser. No. 516,640, Apr. 30, 1990, abandoned.

[30] Foreign Application Priority Data

May 8, 1989 [GB] United Kingdom ............... 8910538

[51] Int. Cl.⁶ ............................................. G05B 19/04
[52] U.S. Cl. .................................... 395/51; 395/920; 395/68
[58] Field of Search ........................................... 395/51

[56] References Cited

U.S. PATENT DOCUMENTS

| | | | |
|---|---|---|---|
| 3,744,029 | 7/1973 | Nyman | 340/175.2 |
| 4,365,297 | 12/1982 | Grisham | 364/200 |
| 4,644,479 | 2/1987 | Kemper et al. | 364/550 |
| 4,812,819 | 3/1989 | Corsberg | 340/517 |
| 4,853,175 | 8/1989 | Book, Sr. | 376/216 |
| 4,890,240 | 12/1989 | Loeb et al. | 364/513 |
| 4,951,225 | 8/1990 | Lee et al. | 364/513 |
| 4,951,234 | 8/1990 | Bellows | 364/550 |

FOREIGN PATENT DOCUMENTS

| | | | |
|---|---|---|---|
| 0249111 | 12/1987 | European Pat. Off. | H03M 11/00 |
| 2544099 | 12/1984 | France | G05B 23/00 |
| 2846053 | 5/1980 | Germany | G05B 23/02 |

OTHER PUBLICATIONS

Moore et al., "A Real–Time Expert System for Process Control", 1984, 569–576.
Dutta, S., "An Event Based Fuzzy Temporal Logic", Proc. 18th Intl. Symp. on Multiple Valued Logic, May 1988, 64–71.
Dean et al., "Temporal Data Base Management", Artificial Intelligence, 32, 1987, pp. 1–55.
Dubois et al., "Processing Fuzzy Temporal Knowledge", IEEE Trans. Syst., Man, and Cybernetics, vol. 19(4), Jul./Aug. 1989, pp. 729–744.
Charniak et al., Artifical Intelligence Programming 2nd ed., 1987, pp. 248–275.

(List continued on next page.)

*Primary Examiner*—Robert W. Downs
*Attorney, Agent, or Firm*—Jack D. Slobod

[57] ABSTRACT

A data processing apparatus includes a computer (1), a detector (2) for external events signalled on a set of input lines (7,8, etc.), and a real time clock 3. A table (20) of rules (24) is included in the computer storage (19). The computer is programmed to respond to a condition, (B,t) stored in a field (26,27) of a rule, being satisfied by generating an associated response (R) stored in a field (28) of that rule. The condition part of each rule requires the continous presence of a specific internal or external behavior (B) stored in the field 26 for a specific finite time (t) stored in the field 27 in order for the rule to be fired. Each time a change of internal behavior occurs due to the firing of a rule, and each time a change of external behavior occurs, signalled on one of the lines 7,8 etc., the rules are examined and the response associated with the next one to be fired on the basis of the behaviors currently present is loaded into a field (33) of a register (23), the time at which the firing is to occur (if there is no intermediate change of behavior which results in a new rule being potentially the next to be fired) being stored in a field 34. If the output of the clock (3) reaches the time stored in the field 34 the response indicated by the data in the field 33 is generated. This response may be purely internal, indicated by changing a flag associated with an entry (25) in a stored table (21), or external, taking the form of a signal on an output line (14,15, etc.).

4 Claims, 4 Drawing Sheets

OTHER PUBLICATIONS

Frank et al., "Application of Artificial Intelligence to improve plant availability," from Intelligen Simulation Environments Proceedings, Jan. 1986, pp. 92–97.

Forgy, "Rete: A Fast Algorithm for the Many Pattern/Many Object Pattern Match Problem," Artificial Intelligence, 1982, pp. 17–37.

Barr et al., The Handbook of Artificial Intelligence vol. IV, 1989, pp. 504–510.

Allen, J. F., "Maintaining Knowledge about Temporal Intervals,", Comm. of the ACM, 26(11), Nov. 1983, pp. 832–843.

Perkins et al., "Adding Temporal Reasoning to Expert-System-Building Environments", IEEE Expert, Feb. 1990, pp. 23–30.

Lumley, J., "Deep Knowledge and Simulation in Knowledge-Based Control", Real-Time Expert Systems in Process Control, Nov. 1985, pp. 511–513.

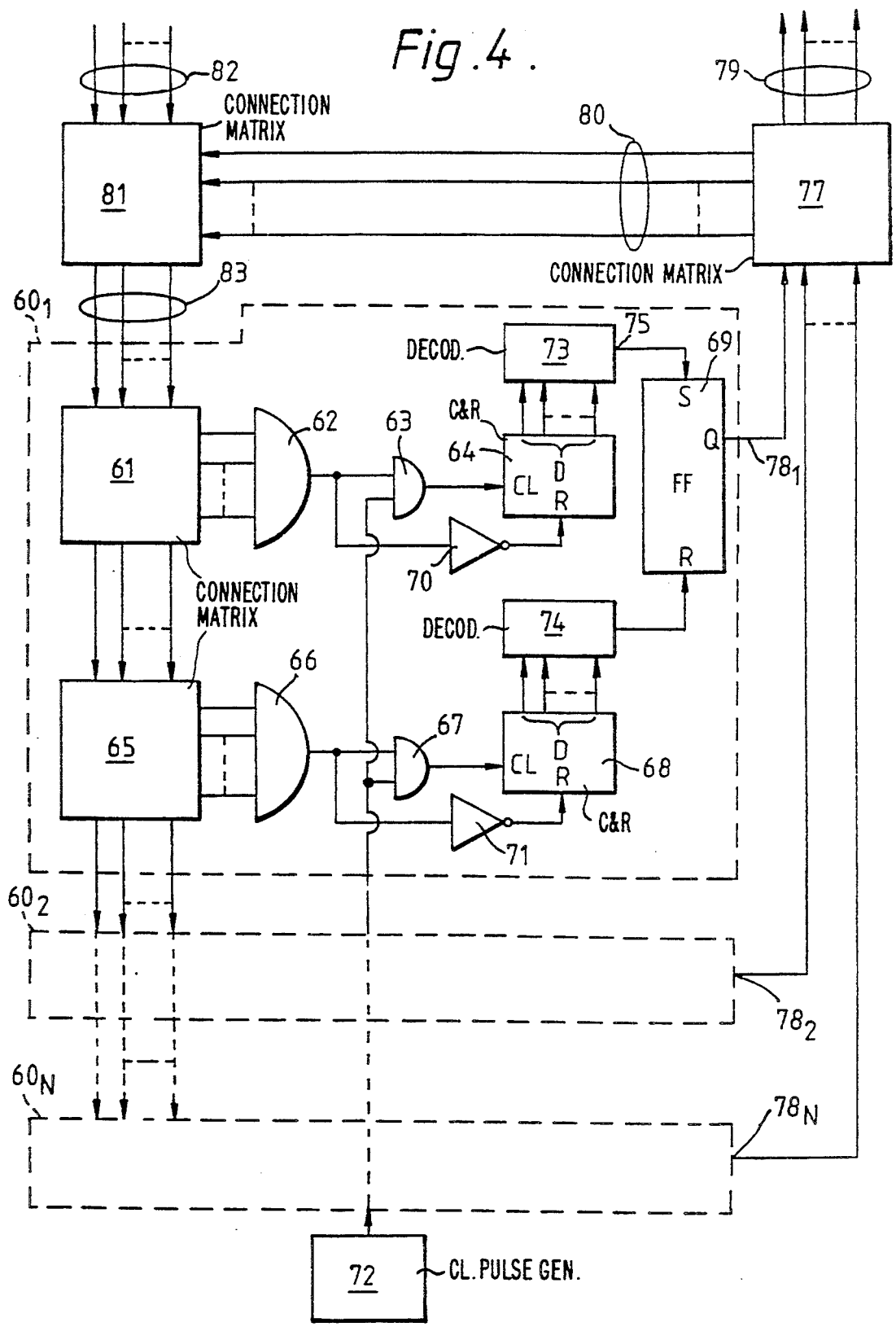

DATA PROCESSING APPARATUS FOR A TEMPROAL BASED RULE SYSTEM

This is a continuation of application Ser. No. 07/972,058, filed Nov. 5, 1992, now abandoned which is a continuation of Ser. No. 07/516,640, filed Apr. 30, 1990 now abandoned.

BACKGROUND OF THE INVENTION

1. Field of the Invention

This invention relates to a data processing apparatus having stored therein a set of rules each in the form of a condition and an associated response, the condition portion of each rule requiring the presence of a specific behaviour and the apparatus comprising means for responding to any said condition being satisfied by generating the associated response.

2. Description of the Related Art

A known apparatus of this general kind is disclosed in an article by R. D. Hill entitled "Supporting Concurrency, Communication and Synchronism in Human-Computer Interactions—The Sassafras UIMS" in ACM Transactions on Graphics, Vol. 5 No. 3 (July 1986) pages 179–210. In this known apparatus, which takes the form of a user-interface management system (UIMS), each rule specifies a response to some external event, e.g. the keying in of a code, or an action to be taken when some state is entered. The condition portion of each rule is either the name of an event followed by a list of flags, or simply a list of flags. The action is a list of flags to raise, events to send, and assignments. All input to the processing part of the apparatus comes through a queue of incoming events (which may be generated within the system by the firing of rules or may be externally input). A rule is fired, i.e. the relevant associated response is generated, when all flags in the condition are raised and the event (if any) is at the head of the queue.

Processing proceeds in the known apparatus by repeating the following two steps:

1. Considering only those rules for which the condition part consists only of a list of flags
   (a) identify and mark all rules that are firable given the current values of the flags,
   (b) fire all the marked rules.
2. Considering all the other rules do once
   (a) identify and mark all rules that are firable given the current values of the flags and the token at the head of the input queue,
   (b) fire all the marked rules
   (c) delete the token at the head of the input queue.

It will be evident that more than one rule may be marked at one time; thus a single event may cause more than one rule to fire.

SUMMARY OF THE INVENTION

In the known apparatus, once a rule is marked it is invariably fired, even though at the time of firing the state of the apparatus may have changed in such a way that the rule should no longer be considered to be marked. This constitutes a limitation. Moreover, if the actual processing speed of the steps 1 and 2 alone is neglected, the rate at which the state of the apparatus evolves can be influenced only by the timing of externally inputted events. It is an object of the present invention to mitigate these disadvantages.

According to one aspect of the invention an apparatus as defined in the first paragraph is characterised in that the condition portion of each of the rules requires the continuous presence of a specific behaviour or set of behaviours for a specific finite time.

It has now been recognised that, by making the condition portion of each of the rules require the continuous presence of a specific behaviour or set of behaviours for a specific finite time, limitations of the known system mentioned above can be ameliorated.

According to another aspect, the invention provides a data processing apparatus for simulating the evolution of a set of behaviours which are included in a set of rules stored within the apparatus, each rule taking the form of a condition and an associated response with the condition portion of each rule requiring the continuous presence of a specific behaviour or set of behaviours for a specific finite time within the simulation and the response portion of each rule entailing a change in a behaviour, said apparatus comprising means for maintaining a record of which of said behaviours are present from stage to stage of the simulation, for referring to the set of rules at each stage of the simulation to determine, on the basis of the behaviours which the record indicates are then present and the times within the simulation at which each such presence began, the time within the simulation at which the next change of behaviour will be effected by the firing of a rule, and for outputting the latter times and the associated changes in behaviour in succession. The said times within the simulation at which each such presence began may be stored as such, for example as a list in conjunction with the relevant items of the record. As an alternative, however, each time (within the simulation) that the condition portion of a rule becomes satisfied, i.e. the behaviour(s) specified in this condition portion become(s) present, the resulting time of firing (within the simulation) of the relevant rule may itself be stored.

According to another aspect the invention provides a data processing system for simulating the evolution of a set of behaviours which are included in a set of rules stored within the system, said system comprising a plurality of data processing apparatuses each for processing a respective part of the set of rules and having that part stored therein, each rule taking the form of a condition and an associated response with the condition portion of each rule requiring the continuous presence of a specific behaviour or set of behaviours for a specific finite time within the simulation and the response portion of each rule entailing a change in a behaviour, each apparatus comprising means for maintaining a record of which of said behaviours are present from stage to stage of the simulation, for referring to its part of the set of rules at each stage of the simulation to determine, on the basis of the behaviours which the record indicates are then present and the times within the simulation at which each such presence began, the time within the simulation at which the next change of behaviour will be effected by the firing of a rule of the respective part of the set if this is the next rule to be fired in any apparatus of the system, and for outputting this time and the associated change in behaviour both from the system and to the other apparatus(es) of the system if said time is the earliest determined by all the apparatuses of the system at the relevant stage of the simulation.

It will be evident that the simulations specified above need not be real-time simulations but may consist, for example, in the directly successive outputting of the successive times at which changes in behaviour occur in the process being simulated, together with data specifying these changes.

BRIEF DESCRIPTION OF THE DRAWINGS

Embodiments of the invention will now be described, by way of example, with reference to the accompanying diagrammatic drawings in which FIG. 4 is a block diagram of a second embodiment.

DETAILED DESCRIPTION OF THE PREFERRED EMBODIMENTS

Figure 1:
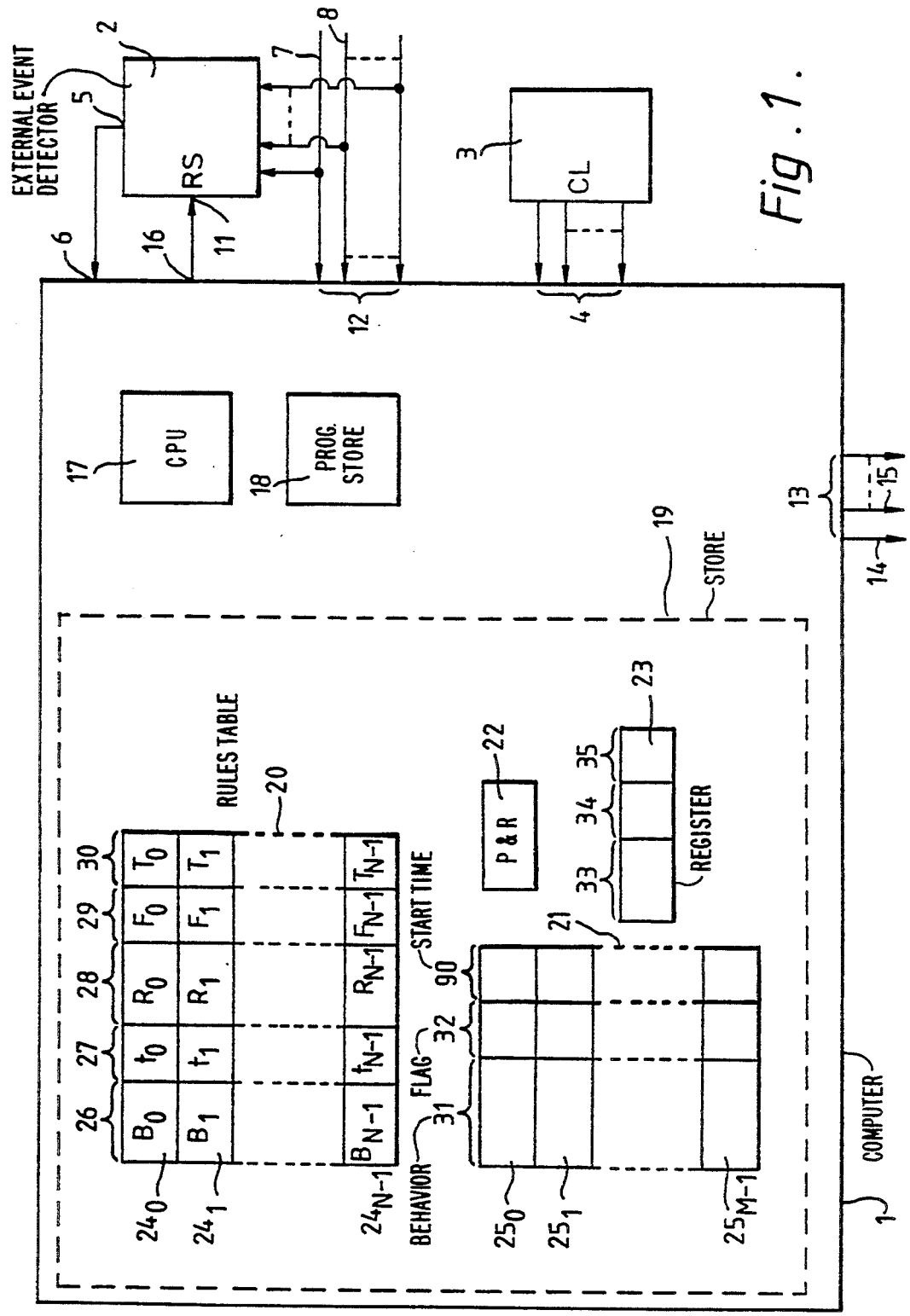
FIG. 1 is a block diagram of a first embodiment

In FIG. 1 a data processing system comprises a computer 1, an external event detector 2 and a real-time clock 3. The output of the clock 3 is connected to an input port 4 of computer 1 and an output 5 of detector 2 is connected to an input 6 of computer 1. The event detector 2 is furthermore provided with a set of signal input lines 7,8 etc., and a reset signal input 11. The signal input lines 7,8 etc., are also connected to respective bit inputs of an input port 12 of computer 1. Computer 1 is provided with an output port 13 respective bit outputs of which are connected to respective signal output lines 14,15, etc. A further bit output 16 of computer 1, for example a further bit output of port 13, is connected to the reset signal input 11 of detector 2.

Detector 2 is constructed to generate a signal on its output 5 each time the logic level on any of its input lines 7,8 etc., changes. A reset signal applied to input 11 results in this logic 1 being reset to logic "0". Detector 2 may comprise, for example, an OR-gate and a set-reset flip-flop and, for each of the input lines 7,8 etc., a positive and negative edge-triggered monostable flip-flop having its input connected to the relevant one of the lines 7,8 etc., and its output connected to the set input of the set-reset flip-flop via the OR-gate, the reset input and the output of the set-reset flip-flop being connected to the input 11 and the output 5 respectively. Computer 1 comprises, in normal manner, a central processing unit 17, a program store 18, and further storage 19. The further storage 19 includes, inter alia, a storage field 20, a storage field 21, a pointer 22, and a register 23. The storage field 20 is in the form of a table having N entries $24_0, 24_1 \ldots 24_{N-1}$ each corresponding to a respective position of pointer 22, and the storage field 21 is similarly in the form of a table having M entries $25_0, 25_1, \ldots 25_{M-1}$. Each of the N entries 24 includes a respective one of the aforesaid rules and has five fields 26, 27, 28, 29 and 30 respectively. Data in the field 26 specifies the behaviour $B_i$ which has to be present for the relevant rule to be "armed", data in the field 27 specifies the time $t_i$ (which may be extremely small) for which the behaviour $B_i$ has to be continuously present for the relevant rule i to be actually "fired", data in the field 28 specifies the response $R_i$ required when the relevant rule i is actually "fired", data in the field 29 constitutes a flag $F_i$ associated with the relevant rule i, and data in the field 30 specifies the real time $T_i$ at which the relevant rule i is to be fired if the flag $F_i$ is raised. Each of the M entries 25 corresponds to a respective one of the behaviours $B_i$ specified in the fields 26 of the N entries 24, or to a respective component of a behaviour $B_i$ if that behaviour is composite. Moreover, each of the input lines 7, 8, etc. has a respective one of the M entries 25 corresponding to it, or has each of the output lines 14, 15, etc. Each of the entries 25 has three fields, 31, 32 and 90 respectively. Data in the field 31 specifies the relevant behaviour or behaviour component, data in the field 32 constitutes a flag indicative of whether the relevant behaviour or behaviour component is present or absent, and data in the field 90 indicates the time at which the relevant behaviour or behaviour component started if the flag in the relevant field 32 is raised. There is an entry 25 corresponding to each and every behaviour and behaviour component specified in the fields 26. Register 23 is loaded during operation with the contents of the field 28 of the entry or entries 24 of table 20 which include that rule or those rules which it is ascertained is/are next to be fired on the basis of the behaviours currently present, as will become evident below. A field 33 of register 23 contains these contents, i.e. data specifying the response(s) which is/are required, a field 34 contains data specifying the real time at which this or these responses are to be effected, and a field 35 contains data indicating from which rule or rules the contents of the field 33 are derived.

Figure 2:
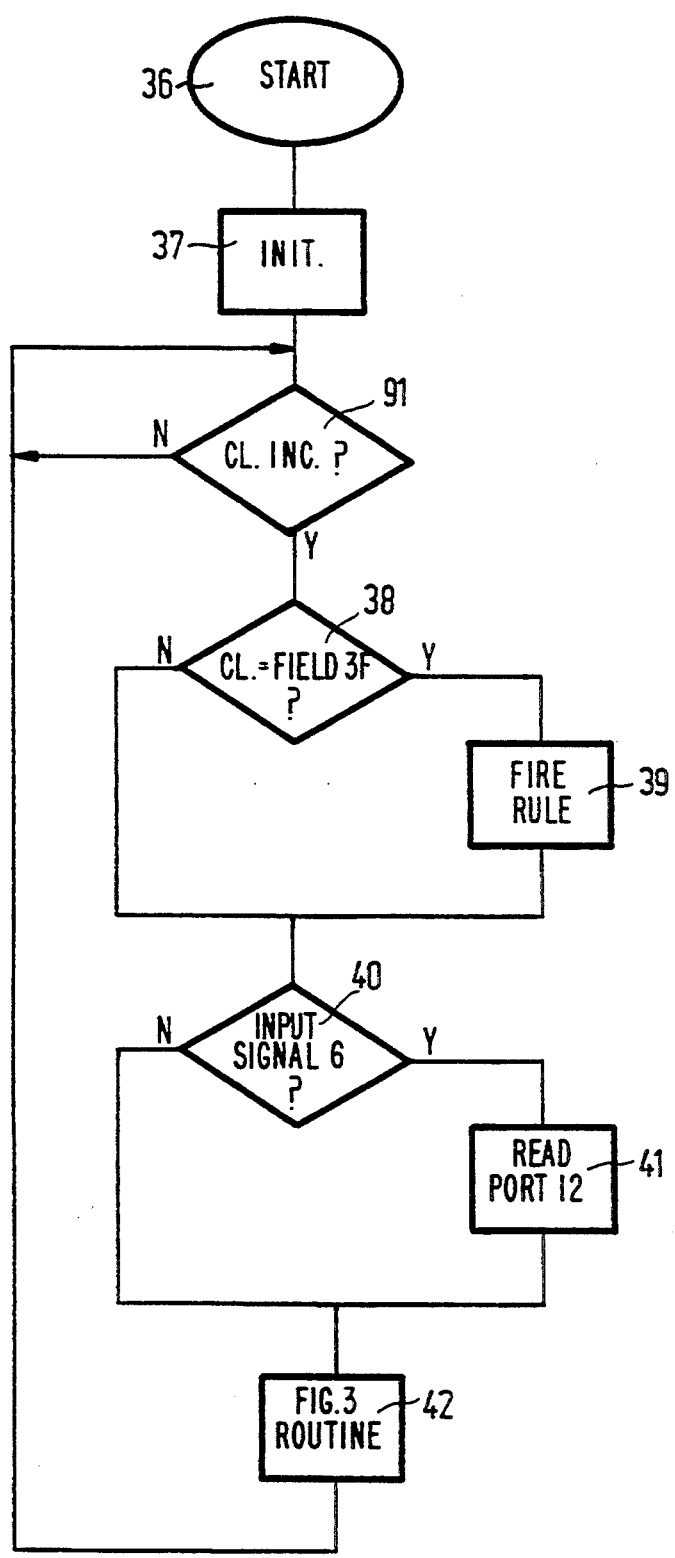
FIGS. 2 and 3 are flow charts indicating the form of a program performed by the embodiment of FIG. 1.
Figure 3:
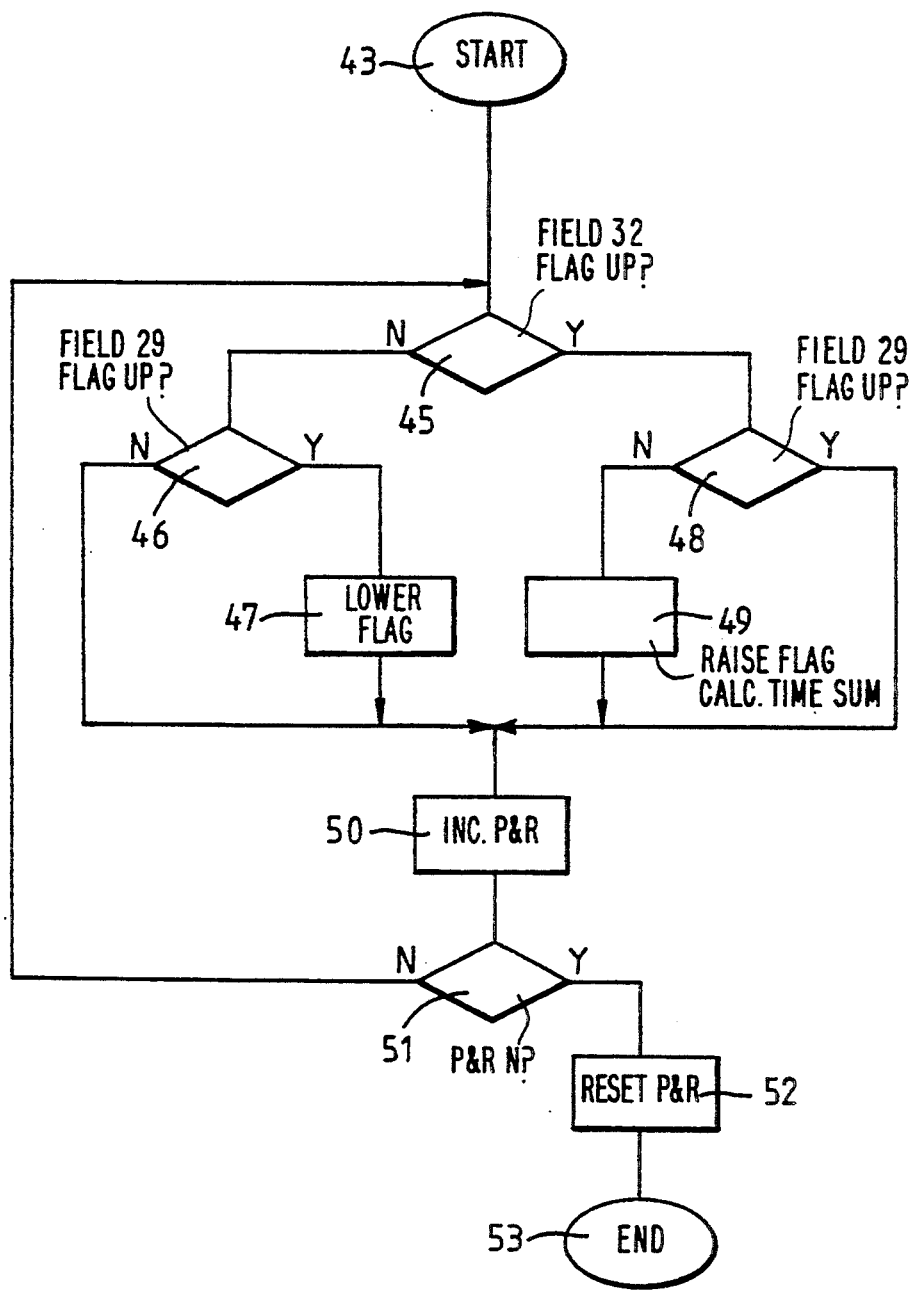

The computer 1 of FIG. 1 is programmed to perform a cyclic main program which takes the form of the flow chart shown in FIG. 2, in which one of the blocks takes the form of the flow chart shown in FIG. 3. The interval between each increment of the real-time clock 3 and the next is chosen sufficiently large that one cycle around the main program can always be accommodated within one such interval.

The various steps in the flow chart of FIG. 2 have the following significances.

36—Start
37—Initialise
91—Has clock 3 newly incremented?
38—Is real time indicated by clock 3 equal to the time T specified by the contents of field 34 of register 23?
39—Perform response(s) specified by the contents of the field 33 and reset the flag F in the field 29 of the entry or entries 24 of table 20 specified by the contents of field 35 of register 23. Raise the flag in the field 32 of any entry 25 of table 21 which corresponds to a behaviour which has been created by the performance of the response(s) and read current real time from 3 into the field 90 of the relevant entry(ies) 25 of table 21. Lower the flag in the field 32 of any entry 25 of table 21 which corresponds to a behaviour which has been removed by the performance of the response(s).
40—Is detector 2 applying a signal to input 6?
41—Read input port 12 to determine the logic levels on the input lines 7,8, etc., and record these in table 21 by adjusting (if necessary) the flag in the field 32 of the entries 25 which correspond to the relevant input lines. For any entry 25 for which the flag in the field 32 is thus newly raised read current real time from 3 into the field 90 of the corresponding entry. Reset detector 2 by generating a reset signal on output 16.
42—Routine of FIG. 3.

The various steps in the flow chart of FIG. 3 have the following significances.

43—Start
45—For the entry 24 of table 20 which is pointed-to by the pointer 22, is/are the behaviour(s) specified in the field 26 present, i.e. indicated as present by the state of the flag(s) in the field 32 of the relevant entry or entries 25 of table 21?

46—For the entry 24 specified in step 45, is the flag F in the field 29 raised?
47—Lower the flag F specified in step 46.
48—Same as 46.
49—For the entry 24 specified in step 45, (a) raise the flag F in the field 29 and (b) calculate the sum of the time stored in the field 27 and the latest time stored in the field(s) 90 of the entry(ies) 25 of table 21 corresponding to the behaviour(s) specified in the field 26, and store result in the field 30.
50—Increment pointer
51—Is content of pointer 22 N?
52—Reset pointer 22 to zero. Examine the contents of the field 30 of all those entries 24 for which the flag in the corresponding field 29 is raised and determine which denote(s) the earliest time. Load this (the real time at which the relevant rule is to be fired if the behaviour(s) specified in the condition portion thereof continue to be present) into field 34 of register 23, the contents of the field 26 of the corresponding entry or entries 24 into the field 33 of register 23, and data identifying the corresponding entry or entries into the field 35 of register 23.
53—End.

As will be evident, the routine of FIG. 3 is always performed subsequent to any updating of the contents of table 21 of FIG. 1 due to a rule having been fired (giving rise to a potential change in internal or external behaviour) and/or to a change having occurred in the input signal on one of the lines 7,8, etc., (corresponding to a change in an external behaviour). Thus the routine of FIG. 3 is performed at least each time a change of behaviour (external or internal) listed in table 21 occurs, and its effect is to ascertain which (if any) of the rules stored in the entries 24 of the table 20 is/are, on the basis of the new set of behaviours currently present as indicated by the table 21, the next to be fired, and load details of the required response, together with the real time at which this should occur, in the register 23. Upon each increment of the real time clock 3 the cyclic main program of FIG. 2 compares the time specified in field 34 of register 23 with real time and, if the real time should reach the specified time, causes the response(s) specified in the field 33 to be carried out, i.e. fires the relevant rule, after which the routine of FIG. 3 is called once again so that the next rule (if any) to be fired on the basis of the behaviour, currently present can be determined and relevant data stored in register 23 (replacing the data currently present).

The times $t_i$ stored in the fields 27 of the entries $24_i$ of the table 20 should, of course, be integral multiples of the time elapsing between each increment of the real-time clock 3 and the next. The minimum such time $t_{min}$ possible is equal to said time elapsing and, if such a time is required in a given entry 24 it is not strictly necessary that this be stored as such in the relevant field 27; the system may be arranged to respond to a lack of information in a given field 27 by adding $t_{min}$ to the latest time specified in step 49. In such a case $t_{min}$ is, in effect, a default value.

As described above each and every entry 24 in the table 20 is evaluated each time the routine of FIG. 3 is performed (making use of the pointer 22). This is not essential as the only entries it is strictly necessary to evaluate are those (if any) for which a behaviour in the field 26 has changed since the routine of FIG. 3 was last performed. Such selectivity can give rise to a substantial reduction in processing and may be achieved, each time the routine of FIG. 3 is performed by, for example, first scanning through all the entries 24 to ascertain and record which have a newly changed behaviour in their field 24 and then only giving the pointer 22 values which correspond to these entries. Alternatively a table (not shown) may be maintained corresponding to each entry 25 in table 21, this table containing a list of all the entries 24 which have the behaviour corresponding to the relevant entry 25 in their field 26. Each time a behaviour changes the relevant table can then be used to indicate which entries 24 are to be evaluated (which values are to be given to the pointer 22).

It will be appreciated that a data processing apparatus of the kind described with reference to FIGS. 1 to 3 is of very wide application. Although its benefits tend to be greatest in applications where the evolution of the overall apparatus is potentially dependent upon a large number of behaviours a rather simple possible application will now be described for illustrative purposes. This application lies in the control of a washing machine to respond to actuation of a start button by (a) filling the wash container with hot water, (b) slowly agitating the laundry for 5 minutes, (c) draining the wash container for 50 seconds, (d) filling the wash container with cold water, and (e) draining the wash container and fast spinning the laundry for 50 seconds. Provision is made for terminating the program and activating a pump fault indicator if the wash container of the machine is still full of water after the draining pump has been operational for 10 seconds, thereby minimising the danger of the pump burning our if it is jammed.

In order to provide this control, event detector 2 should be provided with two input lines 7 and 8 connected to the machine start button and to a water level detector in the wash container respectively, and output port 13 should be provided with six output lines 14, 15 etc., connected to controllers for the hot water valve, the cold water valve, slow running of the wash motor, fast running of the wash motor, the wash container drain pump, and the pump fault indicator of the machine, respectively. The relevant behaviours listed by means of corresponding data in the table 21 may then be the following ready
start__button__pressed
first__filling
full__of__water
hot__valve__open
washing
motor__slow__running
drain__pump__on
second__filling
cold__valve__open
spin
motor__fast__running
pump__fault__indicator__on and the rules listed by means of data in the table 20 may be the following

| Behaviour in Field 26 | Time duration in Field 27 | Behaviour in Field 28 |
|---|---|---|
| 1. Ready & start__button__pressed | $t_{min}$ | no (ready) & first__filling |
| 2. first__filling & no (full__of__water) | $t_{min}$ | hot__valve__open |
| 3. First__filling & | $t_{min}$ | no (hot__valve__open) |

| Behaviour in Field 26 | Time duration in Field 27 | Behaviour in Field 28 |
|---|---|---|
| full_of_water | | & no (first_filling) |
| | | & washing |
| | | & motor_slow_running |
| 4. washing & motor_slow_running | 300 | no (motor_slow_running) & drain_pump_on |
| 5. washing & drain_pump_on | 50 | no (drain_pump_on) & no (washing) & second_filling |
| 6. second_filling & no (full_of_water) | $t_{min}$ | cold_valve_open |
| 7. second_filling & full_of_water | $t_{min}$ | no (cold_valve_open) & no (second_filling) & spin & motor_fast_running & drain_pump_on |
| 8. spin | 50 | no (motor_fast_running) & no (drain_pump_on) & no (spin) & ready. |
| 9. drain_pump_on & full_of_water | 10 | no (drain_pump_on) & no (motor_fast_running) & no (washing) & no (spin) & pump_fault_indicator_on | where the expression "no ( - - - )" means the absence of the behaviour specified between the brackets. Consideration of the above-listed contents of the tables 20 and 21 of FIG. 1 will reveal that the required sequence of operations is carried out, provided that the behaviour "ready" is flagged as being present in the initialisation step 37 of FIG. 2 (the other behaviours being flagged as absent). The behaviours "start_button_pressed" and "full_of_water correspond, in addition to the states of the relevant flags in table 21, to specific logic levels on the relevant ones of the input lines 7 and 8, and the behaviours "hot valve_open", "motor_fast_running", and "pump_fault_indicator_on" correspond, in addition to the states of the relevant flags in table 21, to specific signals generated by the system on the relevant ones of the output lines 14, 15, etc. Conversely the behaviours "ready", "first_filling", "washing", "second_filling" and "spin" correspond merely to states of the relevant flags in the table 21; they are purely internal behaviours although their presence is indicative of a specific process which is being carried out by the machine. It will be noted that the use of these last behaviours in the relevant rules in effect results in rules constituted by the remaining parts of the relevant rules being created and deleted or activated and deactivated at specific stages of the evolution of the machine operation. Thus, for example, the presence of the internal behaviour "washing" in effect results in the creation or activation of the rules

| motor_slow_running | 300 | no (water_slow_running) & drain_pump_on |
|---|---|---|
| and | | |
| drain_pump_on | 50 | no (drain_pump_on) & no (washing) & second_filling | and when the internal behaviour "washing" ceases to be present, these rules are effectively deleted or deactivated. Thus these rules effectively constitute a schema "washing".

An apparatus in accordance with the invention may, if desired, be used merely to simulate the evolution of behaviours in the real world rather than to actually take part in this evolution. Thus, for example, the system described with reference to FIGS. 1-3 may be used to merely simulate the washing machine operations specified above. In order to achieve this it is merely necessary to add rules to the list in table 20 to create internal changes of behaviour corresponding to the changes in the input lines 7,8 to detector 2 (which changes will not of course occur in a mere simulation; indeed detector 2 may be omitted in these circumstances). This can be effected by adding the rules

| Behaviour in Field 26 | Time duration in Field 27 | Behaviour in Field 28 |
|---|---|---|
| 10. ready | 1 | start_button_pressed |
| 11. start_button_pressed | $t_{min}$ | no (start_button_pressed) |
| 12. hot_valve_open | 50 | full_of_water |
| 13. cold_valve_open | 50 | full_of_water |
| 14. drain_pump_on | 5 | no (full_of_water) | or, in order that the activation of the pump fault indicator will also be simulated, the rules 10-13 only. Thus the "start_button_pressed" internal behaviour is momentarily created one second after the "ready" internal behaviour occurs, the internal "full_of_water" behaviour is created 50 seconds after the hot or cold valve open behaviour has been continuously present and, if rule 14 is added, the "no (full_of_water)" internal behaviour is created 5 seconds after the "drain_pump_on" behaviour has been continuously present. Simulation of the operation of actual devices in this way can assist in improvement in their design, diagnosis of faults in them, and predicting the effects of their use.

The simulation described above is simulation in real time. In some circumstances it may be preferred that, instead, the times at which changes in behaviour occur are merely displayed, printed, or otherwise outputted in direct succession, together with the relevant changes in behaviour. In such a case, the real time clock 3 of FIG. 1 may also be omitted, the apparatus of FIG. 1 be provided with a display device, printer or the like (not shown) and the program in store 17 be modified in such manner that, for example, the steps 38-41 and 91 of FIG. 2 are replaced by the single set of operations:

Display, print or otherwise output the time specified in the field 34, and any behaviours created or removed by the response(s) specified in the field 33, of register 23. Reset the flag F in the field 29 of the entry or entries 24 of table 20 specified by the contents of field 35 of register 23. Raise the flag in the field 32 of any entry 25 of table 21 which corresponds to a behaviour which has been created by the response(s) and read the time stored in field 34 of register 23 into the field 90 of the relevant entry(ies) 25 of table 21. Lower the flag in the field 32 of any entry 25 of table 21 which corresponds to a behaviour which has been removed by the response.

It should be noted that the term "behaviour" as used in this specification should be interpreted in a wider sense than is usually the case in everyday usage, in that even static, inanimate objects can exhibit "behaviour"; indeed, their simple presence itself constitutes a form of behaviour. The term may be used, for example, to describe the simple presence of a chair, in addition to its physical properties such as its colour, its weight, its shape, its space occupancy, etc. Moreover, a behaviour may itself comprise one or more of the aforesaid rules, making possible the nesting of rules to any desired extent. Thus a system in accordance with the invention may be used to simulate the evolution of any succession of states in the real world.

If a behaviour stored in the field 26 of one or more of the rules contained in the table 20 of the apparatus described with reference to FIGS. 1–3 constitutes a behaviour of another such apparatus, for example in that it is stored in the field 28 of the table 20 of the other apparatus, it will be appreciated that behaviour of the other apparatus can be made to influence behaviour of the first, for example by connecting the relevant input line or lines 7,8 of the first apparatus to the relevant output line or lines 14,15 of the other apparatus. If the same is true regarding both apparatuses then mutual interaction can occur between them; the two apparatuses can be made to effectively communicate with each other, for example by connecting the relevant input line or lines 7,8 of each to the relevant output line or lines 14,15 of the other, although in other repects they may be quite different from each other, and in particular may perform quite different functions. This obviously applies also when more than two such apparatuses are present in an environment. Thus if a plurality of such apparatuses equipped in this way to communicate with each other by ordinary behavioural signs are present in an environment further apparatuses whose principal roles are quite diverse can be added, provided only that part of their behavioural specification allows reception and transmission of those signs and the initiation of suitable actions on their reception. In principle no changes are necessary as these new apparatuses are introduced.

It is recognized that the term "behaviour" is not common in this field; hence the effort expended to explain its meaning. A term that can be used in its place in the context of the invention is "argument". Associated with each rule is an argument and a time interval during which, on a continuous basis, the argument must be present, the confirmation constituting the condition portion of the rule. Typically, the argument would be a state, sequence of states, or change of state of an object that can be detected and thus a record maintained of its presence and the duration of each presence. When the condition portion is satisfied, the rule is fired or activated to generate the response associated therewith.

If the table 20 of the apparatus described with reference to FIGS. 1 to 3 contains a very large number of rules then the processing required each time there is a change in a behaviour stored in the field 21 may be considerable and this can result in the total reaction time of the apparatus to such a change of behaviour becoming undesirably long. If this is the case the processing may be shared between a plurality of apparatuses of the kind described if each of these apparatuses is provided with a two-way communication channel to each of the others, for example via a central node. The set of rules which would otherwise be stored in a single table 20 may then be divided into a plurality of parts each of which is stored in the corresponding table of a respective apparatus of the plurality, the relevant behaviours then being stored in the table 21 of that apparatus. In order that the various apparatuses should operate in a coordinated manner each may then be arranged to transmit indications of each change of behaviour inputted thereto via one of the lines 7, 8 etc., and each change of behaviour generated thereby by the firing of one of the internally stored rules, to each of the other apparatuses, for example as part of each step 39 and 44 of FIGS. 2 and 3 respectively. These indications may be arranged to take the form, for example, of signals on respective ones of the input lines 7,8, etc. of each of the other apparatuses, so that all apparatuses respond in an appropriate manner each time a change of behaviour occurs. In fact a plurality of apparatuses operating and intercommunicating in this way may, if the input lines 7,8 etc. of each are connected in parallel with the corresponding lines of the others, be made to constitute a fault-tolerant whole, because if a given apparatus becomes faulty, it can be arranged that its stored rules and behaviours are automatically distributed between the remaining apparatuses (giving rise to a loss of processing speed but avoiding a complete breakdown). This process can be assisted if in fact each apparatus has stored therein the complete set of rules and behaviours, all but the relevant part being deactivated during fault-free operation.

The sharing of the processing between a plurality of apparatuses in the above-described manner can obviously also be achieved in the case when it is required merely to simulate in real time the evaluation of behaviours in the real world, as described hereinbefore. For the alternative form of simulation in which the times at which changes in behaviour occur are merely displayed or otherwise outputted in direct succession together with the relevant changes in behaviour, this sharing can still be achieved, but in such a case it will be necessary to examine the predictions made by each apparatus each time a change of behaviour occurs. Each apparatus will make a prediction based on its own part of the total set of rules and behaviours and obviously, it is the earliest of these which is/are to be outputted next. Thus when this type of simulation is performed it can be arranged that each apparatus communicates its own predicted time of the next change of behaviour to the central node each time a change of behaviour occurs, the central node then determining which of these predicted times is the soonest and communicating this back to all the apparatuses to deactivate the relevant outputting by any apparatus which is predicting the time of the next change of behaviour as something other than the time received from the central node. This deactivation may consist in the cancellation for the current program cycle of the aforesaid single set of operations replacing the steps 38–41 and 91 of FIG. 2 and its replacement by the updating of the relevant table 21 in accordance with said soonest time and the associated change(s) in behaviour (which will have to be communicated from the non-deactivated apparatus(es) to the deactivated apparatus(es)).

Although an embodiment of the invention has been described in which the required functions are effected by means of an internally-stored program it will be appreciated that such control is not necessarily the case. The rules may alternatively be stored in the apparatus in hard-wired form and the response to the relevant condition being satisfied may also be generated by means of hardware alone. If this is the case the apparatus may take the form indicated by the block diagram of FIG. 4.

In FIG. 4 a data processing apparatus in accordance with the invention comprises a set of logic circuits $60_1$, $60_2, \ldots 60_N$ each corresponding to a respective pair of the aforesaid rules, where the response to the condition portion of one rule of each pair being satisfied is the negative of the response to the condition portion of the other rule of the relevant pair being satisfied. Each circuit 60 comprises a connection matrix 61, two AND-gates 62 and 63, a counter 64, a decoder 73, and an inverter 70 corresponding to one rule of the relevant pair, connection matrix 65, two AND-gates 66 and 67, a counter 68, a decoder 74, and an inverter 71 corresponding to the other rule of the relevant pair, and a set-reset flip-flop 69. The AND-gates 63 and 67 each have two inputs one of which is fed from a common clock pulse generator 72. The other input of AND-gate 63 is fed from the output of AND-gate 62, and the other input of AND-gate 67 is fed from the output of AND-gate 66. The clock inputs CL of the counters 64 and 68 are fed from the outputs of the AND-gates 63 and 67 respectively and the reset inputs R thereof are fed from the outputs of the AND-gates 62 and 66 respectively via the inverters 70 and 71 respectively. The output D of counter 64 is fed to decoder 73 and the output D of counter 68 is fed to decoder 74. The outputs 75 and 76 of the decoders 73 and 74 are connected to the set (S) and reset (R) inputs respectively of the flip-flop 69 the Q-output 78 of which is connected to a respective input line of a connection matrix 77. The decoders 73 and 74 are constructed to generate a signal on their outputs 75 and 76 respectively when the count in the corresponding counter 64 and 65 respectively reaches a predetermined non-zero value, this value corresponding to the time for which the set of behaviours required to "arm" the relevant rule has to be present in order for the rule to actually be fired. The connection matrix 77 has first and second multiple outputs 79 and 80 respectively, the output 80 being connected to a connection matrix 81 which has a further multiple input 82. The output 79 and the input 82 constitute the connection of the apparatus to the outside world; the input 82 may be omitted if the apparatus is to be used merely for simulation. The multiple output 83 of connection matrix 81 is connected to the connection matrices 61 and 65. Signals on respective lines of this output 83 (derived from either input 82 or internally from respective outputs 78 via connection matrix 77) are indicative of whether respective behaviours required to "arm" the various rules are present or absent. AND-gate 62 has an input (which may be inverting if appropriate) corresponding to each behaviour which has to be present to "arm" the relevant rule, this input being connected to the relevant line of the output 83 in the matrix 61. Thus, when these behaviours are all present, AND-gate 63 is enabled, allowing clock-pulse generator 72 to increment counter 64. If this situation continues for a suffient time decoder 73 generates on output signal which sets flip-flop 69 (if it is not already set) resulting in a logic "1" on output $78_1$. However, if the requisite set of behaviours ceases to be present before this occurs, AND-gate 63 is disabled once again and counter 64 is reset to zero via inverter 70. The components 66, 67, 68, 71, 74 operate in a similar way, but this time in response to the presence of behaviours derived from the output 83 via connection matrix 65. However, an output signal from decoder 74 results in the resetting of flip-flop 69 (if it is not already reset) and hence in logic "0" on the output $78_1$. It will be evident that the counters 64 and 68 should be of the kind which stop when they reach their maximum count, to ensure that only one output signal is generated each time the relevant behaviours become present even if the relevant behaviours continue to be present for a substantial time after they have given rise to the required output signal from the relevant decoder. The circuits $60_2 \ldots 60_N$ operate in a similar way to the circuit $60_1$.

From reading the present disclosure, various modifications will be apparent to persons skilled in the art. Such modifications may involve other features which are already known per se, and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A data processing apparatus for carrying out a simulation of an evolution over sequential stages of the simulation of a set of behaviors, each behavior being external of, or internal to, said data processing apparatus, said apparatus comprising means for storing a set of rules within the apparatus, each rule taking the form of a condition portion and a response portion with the condition portion of each stored rule requiring the continuous presence of a specific behavior or set of behaviors for a specific finite time exceeding zero within the simulation and the response portion of each rule specifying a change in behavior, means within the apparatus for maintaining a record of which of said set of behaviors are present from stage to stage of the simulation, for modifying said record upon a termination of a behavior of said set to indicate that the terminated behavior is not present, for referring to the stored set of rules at each stage of the simulation to determine, on the basis of the behaviors which the record indicates are then present and times within the simulation at which each such presence last began, future times within the simulation at which next changes in behavior, associated with said future times, will be effected by the firing of rules, and for outputting said future times and the associated next changes in behavior in succession.

2. A data processing system for carrying out a simulation of an evolution over sequential stages of the simulation of a set of behaviors which are included in a set of rules each behavior being external of, or internal to said data processing system, said system comprising a plurality of data processing apparatuses each comprising means for storing within said data processing apparatus a respective part of the set of rules and means for processing that part stored therein, each stored rule taking the form of a condition portion and a response portion, with the condition portion of each rule requiring the continuous presence of a specific behavior or set of behaviors for a specific finite time exceeding zero within the simulation and the response portion of each rule entailing a change in a behavior, each data processing apparatus comprising means for maintaining a record of which of said set of behaviors are present from stage to stage of the simulation, for modifying said record upon a termination of a behavior of said set to indicate that the terminated behavior is not present, for referring at each stage of the simulation to its respective part of the set of rules stored within said data processing apparatus to determine, on the basis of the behaviors which the record indicates are then present and times within the simulation at which each such presence last began, a future time within the simulation at which a next change in behavior will be effected by the firing of a rule of the respective part of the set if this is the next rule to be fired in any data processing apparatus of the system, and for outputting said future time and next change in behavior both from the system and to the other apparatuses of the system if said future time is the earliest determined by all the data processing apparatuses of the system at the relevant stage of the simulation.

3. A data processing apparatus for controlling an evolution over sequential stages of a set of behaviors, each behavior being external of, or internal to, said apparatus, said apparatus comprising means for storing a set of rules stored within the apparatus, each rule taking the form of a condition portion and a response portion with the condition portion of each stored rule requiring the continuous presence of a specific behavior or set of behaviors for a specific finite time exceeding zero within the evolution and the response portion of each rule specifying a change in behavior, means within the apparatus for maintaining a record of which of said set of behaviors are present from stage to stage of the evolution, for modifying said record upon a termination of a behavior of said set to indicate that the terminated behavior is not present, for referring to the stored set of rules at each stage of the evolution to determine, on the basis of the behaviors which the record indicates are then present and times within the evolution at which each such presence last began, future times within the evolution at which next changes of behavior, associated with said future times, will be effected by the firing of rules, and for effecting said next changes in behavior by the firing of said rules only if, when current time reaches said future times, said record indicates that the specific behavior or set of behaviors with which said future times are associated have remained continuously present.

4. A data processing system for controlling an evolution over sequential stages of a set of behaviors which are included in a set of rules each behavior being external of, or internal to said system, said system comprising a plurality of data processing apparatuses each comprising means for storing within said apparatus a respective part of the set of rules and means for processing that part stored therein, each stored rule taking the form of a condition portion and a response portion, with the condition portion of each rule requiring the continuous presence of a specific behavior or set of behaviors for a specific finite time exceeding zero within the evolution and the response portion of each rule entailing a change in a behavior, each apparatus comprising means for maintaining a record of which of said set of behaviors are present from stage to stage of the evolution, for modifying said record upon a termination of a behavior of said set to indicate that the terminated behavior is not present, for referring at each stage of the evolution to its respective part of the set of rules stored within said apparatus to determine, on the basis of the behaviors which the record indicates are then present and times within the evolution at which each such presence last began, a future time within the evolution at which a next change of behavior will be effected by the firing of a rule of the respective part of the set if this is the next rule to be fired in any apparatus of the system, and for outputting this future time and the associated change in behavior to the other apparatuses of the system if said future time is the earliest determined by all the apparatuses of the system at the relevant stage of the evolution, and for effecting said next changes in behavior by the firing of said rules only if, when current time reaches said future times, the applicable record indicates that the specific behavior or set of behaviors with which said future times are associated have remained continuously present.

* * * * *